E. ADAMSON.
SHOCK ABSORBER.
APPLICATION FILED JULY 30, 1920.

1,392,902.

Patented Oct. 11, 1921.
2 SHEETS—SHEET 1.

Inventor
Ernie Adamson
By Thomas R. Harney
Attorney

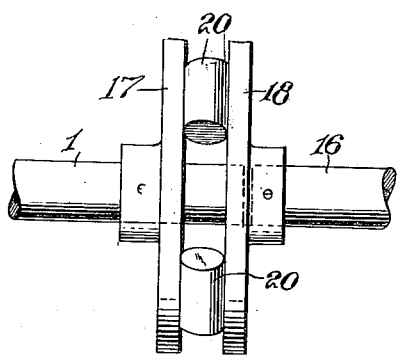
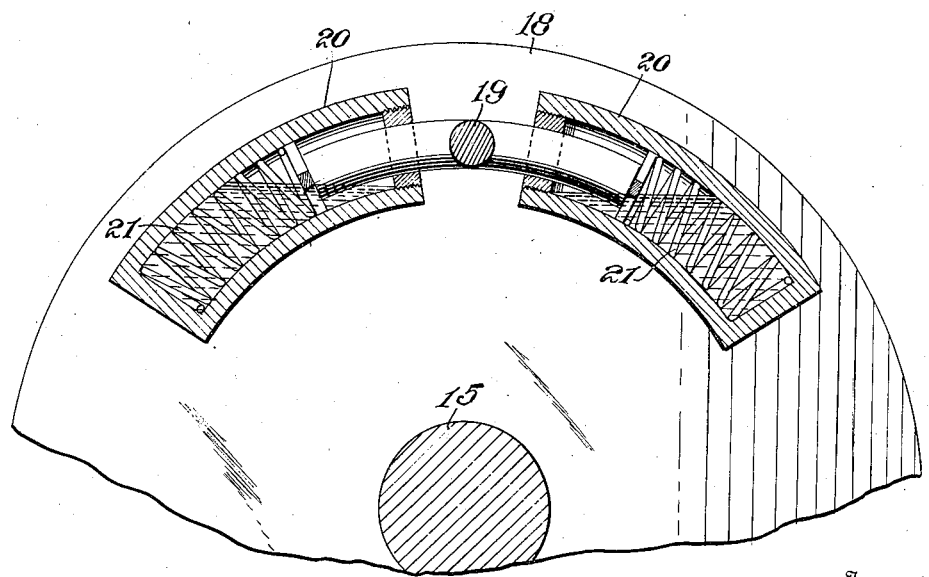

UNITED STATES PATENT OFFICE.

ERNIE ADAMSON, OF NEW YORK, N. Y.

SHOCK-ABSORBER.

1,392,902.     Specification of Letters Patent.     Patented Oct. 11, 1921.

Application filed July 30, 1920. Serial No. 400,046.

*To all whom it may concern:*

Be it known that I, ERNIE ADAMSON, a citizen of the United States of America, residing at New York, in the county of New York and State of New York, have invented certain new and useful Improvements in Shock-Absorbers, of which the following is a specification.

My present invention relates generally to shock absorbers and more particularly to devices for absorbing torque shocks, my object being the provision of a simple inexpensive and durable arrangement applicable to the drive shafts of automobiles and motor cars for absorbing torque shocks and relieving the transmission and differential gears as well as the universal joints of jolts, jars and excessively wearing strains.

The accompanying drawings show the preferred construction I have devised for this purpose and form a part of this specification. In these drawings:

Fig. 4 is a detail side view of the complete joint, and,

Fig. 5 is an enlarged partial section between the disks.

Figure 1:
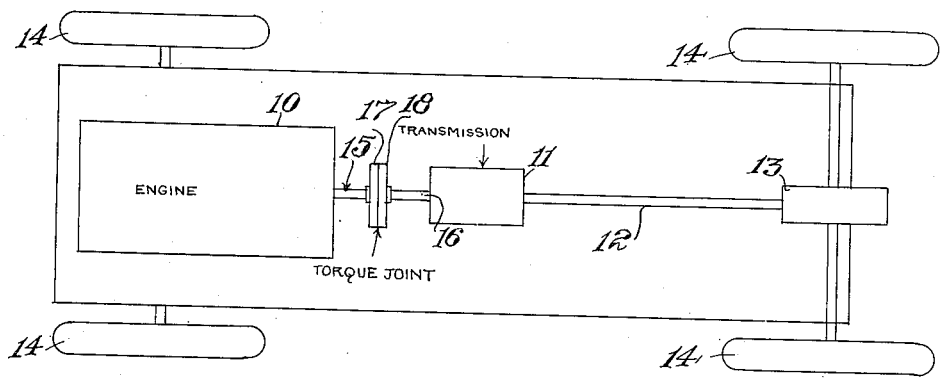
Figure 1 is a plan view of diagrammatic nature showing the disposition of my invention relative to the ordinary parts of the running gear of an automobile.
Figure 2:
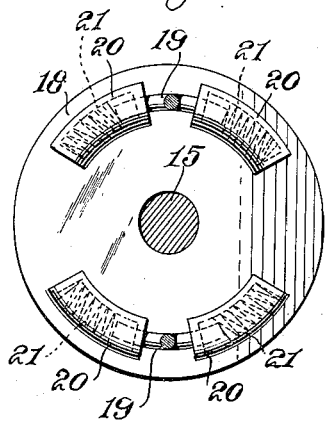
Fig. 2 is a sectional view through the torque joint looking at the inner face of one of the disks.

Referring now to these figures, I have shown in Fig. 1 certain parts of a conventional automobile including the engine 10, transmission 11, propeller shaft 12, differential 13, wheels 14 and drive shaft, the latter of which is for the purpose of my invention divided into sections 15 and 16. These sections are in endwise abutting relation and respectively support, and are rigidly connected to, a pair of joint plates or disks 17 and 18, section 15 of the shaft preferably passing completely through disk 17 and having its extremity journaled in disk 18 carried by section 16.

Figure 3:
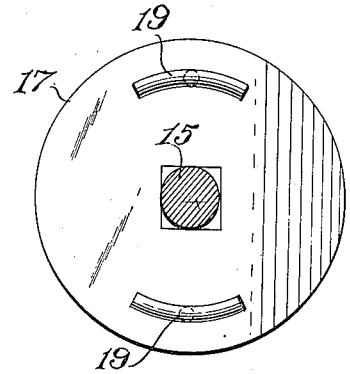
Fig. 3 is a similar view looking at the inner face of the other disk.

The disks 17 and 18 may be secured upon squared portions of the shaft sections if desired, and their connections include a pair of diametrically opposite plungers 19 rigidly outstanding from the inner face of disk 17, each plunger of the double end form shown particularly in Fig. 3, curved concentric with the drive shaft, and each sufficiently spaced from disk 17 to enter the arcuately curved cylinders 20 of disk 18.

The cylinders 18 are disposed in pairs at diametrically opposite sides of the inner face of disk 18 and secured thereto, the cylinders of each pair opening toward one another to slidably receive the plungers 19 so that the connections of plungers 19 with their disk 17 lie between the adjacent ends of the cylinders of each pair. This gives each plunger movement in opposite directions so that shocks are taken care of in both forward and reverse rotation of the parts.

Each of the cylinders is provided with an internal spring 21, preferably a coil spring, and these springs under normal conditions serve to maintain plungers midway between the cylinders. Each cylinder is furthermore filled to about three-quarters of its capacity with a heavy oil and air occupies the remaining space so that as the plungers enter to a greater extent than their normal projection, the torque is applied through the air cushion and the parts remain at all times in proper condition to absorb shocks of operation and relieve the usual running strains as well as excessive wear.

It will be understood that the plungers are carefully and perfectly fitted in the cylinders in the first instance and the latter rigidly connected to disk 18 in any suitable manner, the fact that shaft section 15 has bearing in both disks, precluding any danger of yielding of the joint except as previously described for the purposes of this invention.

I claim:—

1. A driving connection adapted to absorb driving shocks, consisting of a pair of spaced parallel supporting members, arcuate cylinders partially filled with fluid and spaced apart in pairs on one of said members, the cylinders of each pair having reduced openings at their inner adjacent ends, a plunger outstanding from the other member between the cylinders of each pair and having arcuately curved pistons projecting oppositely therefrom and into the said cylinders, the said pistons slidably interfitting the reduced openings of the cylinders and being spaced throughout their lengths from the cylinder walls, and a spring in each cylinder moving in the fluid thereof and engaging the adjacent end of the respective piston.

2. A drive shaft in axially alined sections, disks secured to the adjacent ends of said sections, arcuate fluid holding cylinders carried by one of said disks and circumferentially spaced thereon in pairs, double end plungers carried by the other disk and projecting between the cylinders of the pairs, the ends of each plunger extending into the adjacent ends of the cylinders of each pair and slidable therein in spaced relation to the walls of the cylinders, said cylinders being partially filled with fluid, and springs within the cylinders moving in the fluid and engaging the extremities of the plungers as described.

3. A drive shaft in axially alined sections, disks secured to the adjacent ends of said sections in spaced apart relation, arcuate fluid holding cylinders carried by one of said disks and circumferentially spaced in pairs, double end plungers outstanding from the other disk having oppositely projecting end portions paralleling the disk and forming pistons within the inner ends of the cylinders of said pairs of cylinders, spaced from the walls of the cylinders, said cylinders being partially filled with fluid, and springs operating in the fluid within the cylinders and engaging the extremities of said pistons for the purpose described.

In testimony whereof I have affixed my signature.

ERNIE ADAMSON.